July 3, 1923.
S. M. CARMEAN ET AL
ELECTRIC CUT-OUT
Filed Feb. 20, 1922
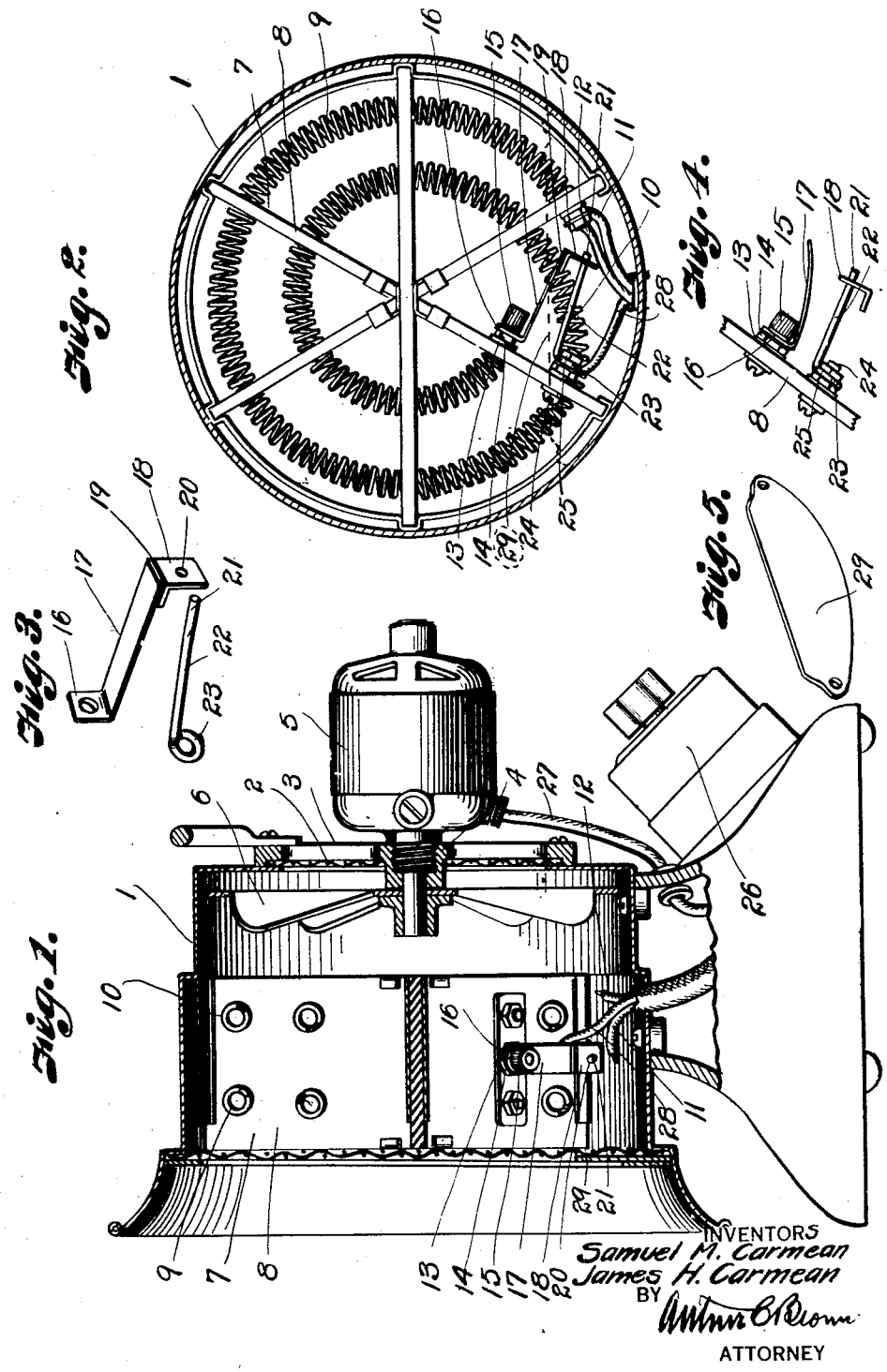
INVENTORS
Samuel M. Carmean
James H. Carmean
BY
ATTORNEY Patented July 3, 1923.

1,460,943

UNITED STATES PATENT OFFICE.

SAMUEL M. CARMEAN AND JAMES H. CARMEAN, OF KANSAS CITY, MISSOURI.

ELECTRIC CUT-OUT.

Application filed February 20, 1922. Serial No. 537,793.

*To all whom it may concern:*

Be it known that we, SAMUEL M. CARMEAN and JAMES H. CARMEAN, citizens of the United States, residing at Kansas City, in the county of Jackson and State of Missouri, have invented certain new and useful Improvements in Electric Cut-Outs; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a circuit cut-out for an electric heater and the primary object thereof is to provide a simple, efficient, self-acting means for breaking the circuit to the heater elements whenever the heater elements generate excessive heat.

For example, the cut-out is particularly designed for use in connection with a heater such as disclosed in our Patent No. 1,366,519 of January 25, 1921 which includes a heating element and an impeller for directing air over the heating element.

In such devices the temperature of the heating element is not raised to a dangerous point because the heat is dissipated by currents of air directed past it by the impeller. The impeller is driven independently of the heating element, that is, its motor can be operated to direct cold air over the heating elements while the heating elements are not energized; in which event the heater becomes a fan.

Sometimes the impeller may cease to operate while the heating element is energized and if that should happen, after a time the heating element would oxidize or possibly fuse on account of the high temperature generated.

It is the primary purpose of our invention to prevent the disadvantageous result above noted and to this end we have provided a self-acting cut-out which will cause an interruption of the heating element circuit whenever the temperature of the heating element reaches a critical stage; that is, whenever the temperature is higher than that at which it is intended that the heating element should operate.

To this end the invention consists in certain novel arrangements which will be apparent by reference to the following description in connection with the accompanying drawings, in which—

Fig. 1 is a vertical, longitudinal, sectional view through a heater showing a cut-out constructed in accordance with our invention associated therewith.

Fig. 2 is a sectional view through the casing showing a heating element and cut-out.

Fig. 3 is a detail perspective view of the cut-out.

Fig. 4 is a side view of the cut-out showing the position of the parts when the circuit is broken, and Fig. 5 is a detail perspective view of an air shield for the cut-out.

In so far as this invention is concerned it is deemed unnecessary to specifically describe the construction of the heater.

It will be observed, however, that the illustrated embodiment of the selected form of heater includes a casing 1 having an air inlet 2 at its rear end. A spider ring 3 carries a bearing 4, in which is mounted a motor 5, on the shaft of which and within the casing 1 is an air impeller or fan 6 for drawing air through the opening 2 and directing it over the heating element 7.

The detail construction of the heating element is immaterial but we have shown it as including a plurality of radial blades 8, received within the casing 1 and carrying heating coils 9 and 10. The heating coils are supplied with current from a suitable source through the conductors 11 and 12. The coils project through the openings in the radial blades 7 and their ends distant from those attached to the conductors 11 and 12 are connected to a bus bar 13, having a binding post 14 which carries a nut 15 so as to secure the angular lip 16 of the spring finger 17 to the bus bar. The outer end of the finger 17 has a detachable member 18 secured to it by a suitable fusible material 19. The particular fusible material used will be that which will fuse at a predetermined temperature and as there are many kinds of fusible materials now on the market, we reserve the right to avail ourselves of any of them.

The detachable member 18 is shown as provided with a perforation 20 to normally receive the end 21 of a bracket bar or pin 22 having at one end an eye 23, held fast on a binding post 24 by the nut 25. The binding post 24 will be in electric connection with the return circuit conductor.

The switch 26 is a multiple switch, which has several positions, one to turn on the fan, one to energize the coil 9, through conductor 11, one to energize the fan and both coils, and an "off" position. These switches, however, are so well understood that it is deemed unnecessary to describe them with any particularity.

From the foregoing it will be understood that the switch 26 can be turned so as to energize the motor 5 through the conductor 27 and then the fan only will operate. At another position one of the coils may be brought into action so that the air will pass over but one coil and the temperature of the air emitted from the casing 1 will be less than maximum. At another position of the switch, both coils will be energized, when the heater will be operating at its maximum. The current will then be passing through the conductor 27 to energize the motor to operate the fan through the conductors 11 and 12 to energize the two coils and the current for the heating element will pass out through the conductor 28 secured to the binding post 24.

While the fan is operating the heat will be dissipated sufficiently fast to prevent the fusing of the fusible material 19. Should the fan stop, however, the temperature in the coils will immediately rise sufficiently high after a time to fuse the material 19, allowing the detachable member 18 to drop, as shown in Fig. 4, and since the finger 17 has an inherent spring tendency, it will tend to move away from the point 21 so that there will be an appreciable gap in the circuit, thereby breaking it so that no more current can pass through the coils until a new cut-out is installed. which can be accomplished by removing the nut 15 and substituting a new finger 17 with a removable element 18 held thereto by the fusible material and with a bracket finger 22 in the opening 20, as seen in Figs. 1 and 2.

Since the finger 17 has an inherent spring tendency, it is apparent that it will be normally under tension and that in relieving its tension, it will spring away from the finger 21.

In order to cause the localization of the heat adjacent to the fusible material 19, we may place a segmental guard sheet 29 at the lower portion of the heater casing so that atmospheric air will be shielded away from the lower portion of the coil and thereby allow it to become more quickly heated than the remaining portion of the coil, which will be exposed to atmosphere. This shield, however, is not essential in every instance so we desire to be not limited to its use in all instances.

It will be observed that when the renewal is made, it will not be necessary to remove the nut 25 because the finger 22 can remain in its original position, it being only necessary to take off the nut 15, place a renewal which consists of the members 17 and 20 secured together, on the post 4, and then apply the nut. When this is done, of course, the finger 22 will be projected through 20. Then the device is ready for use again.

What we claim and desire to secure by Letters-Patent is:

1. An electric heater comprising a casing, a heating element therein, an air impeller for directing air over the heating element, and an electric circuit cut-out associated with an electric heater and movable in response to heat generated by the heater whereby the circuit will be broken when the impeller ceases to operate.

2. An electric heater comprising a casing, a heating coil therein, a circuit for the heating coil, and a cut-out in the circuit comprising two members normally connected together, one of said members having a detachable part normally held to it by a fusible material, the fusible material being adapted to melt at a given temperature to break the connection between the two members whereby the circuit will be broken.

3. An electric heater comprising a casing, a heating coil therein, an electric cut-out associated with the coil and movable in response to heat of the heating coil for breaking the circuit, and an air shield carried by the casing to protect the cut-out from the cooling influence of air outside the casing.

4. An electric heater comprising a casing, a heating element therein, a circuit for the heating element, a cut-out in the circuit, and an air impeller for directing air over the heating element, the cut-out being adapted to break the circuit when the air impeller is at rest.

In testimony whereof we affix our signatures.

SAMUEL M. CARMEAN.
JAMES H. CARMEAN.